US009148409B2

(12) United States Patent
Fitzgibbon et al.

(10) Patent No.: US 9,148,409 B2
(45) Date of Patent: Sep. 29, 2015

(54) METHOD AND APPARATUS TO FACILITATE MESSAGE TRANSMISSION AND RECEPTION USING DIFFERENT TRANSMISSION CHARACTERISTICS

(75) Inventors: James J. Fitzgibbon, Batavia, IL (US); Edward T. Laird, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 2260 days.

(21) Appl. No.: 11/172,525

(22) Filed: Jun. 30, 2005

(65) Prior Publication Data

US 2007/0005806 A1   Jan. 4, 2007

(51) Int. Cl.
  H04L 9/00   (2006.01)
  H04L 29/06   (2006.01)
  G07C 9/00   (2006.01)

(52) U.S. Cl.
  CPC ........ H04L 63/0428 (2013.01); G07C 9/00309 (2013.01); G07C 2009/00412 (2013.01); G07C 2009/00492 (2013.01)

(58) Field of Classification Search
  CPC ......... H04L 29/08; H04L 41/00; H04L 45/00; H04J 7/00; G06F 19/00
  USPC .......... 709/201, 223–225, 232, 238; 370/230, 370/235, 235.1, 308, 351; 705/51, 58; 713/165, 170; 726/3
  See application file for complete search history.

(56) References Cited

U.S. PATENT DOCUMENTS

| 3,906,348 | A | 9/1975 | Willmott |
| 4,097,859 | A | 6/1978 | Looschen |
| 4,178,549 | A | 12/1979 | Ledenbach et al. |
| 4,243,976 | A | 1/1981 | Warner et al. |
| 4,255,742 | A | 3/1981 | Gable et al. |
| 4,387,455 | A | 6/1983 | Schwartz |
| 4,387,460 | A | 6/1983 | Boutmy et al. |

(Continued)

FOREIGN PATENT DOCUMENTS

| EP | 1223700 | 7/2002 |
| EP | 1313260 | 11/2004 |

(Continued)

OTHER PUBLICATIONS

Search Report Under Section 17; Application No. GB0613068.6: Date of Search: Aug. 23, 2006.

(Continued)

*Primary Examiner* — Joseph P Hirl
*Assistant Examiner* — Leynna Truvan
(74) *Attorney, Agent, or Firm* — Fitch Even Tabin & Flannery LLP (57) ABSTRACT

Upon providing (101) message content (such as a remote control instruction) to be transmitted, and in conjunction with provision (102) of a plurality of different transmission characteristics (as correspond, for example, to different types of transmission) and a corresponding plurality of correlated recovery identifiers (103), a particular transmission characteristic is selected (104) and used to transmit (105) a joint message. n particular, in a preferred approach, the selected transmission characteristic (106) is used when transmitting at least a portion of the message content portion of the joint message while another part of the joint message carries the recovery identifier to thereby facilitate selection of an appropriate reception technique by a receiver when receiving the joint message.

49 Claims, 3 Drawing Sheets

(56) References Cited

U.S. PATENT DOCUMENTS

| | | | |
|---|---|---|---|
| 4,468,787 A | 8/1984 | Keiper, Jr. | |
| 4,566,044 A | 1/1986 | Langdon et al. | |
| 4,677,284 A | 6/1987 | Genest | |
| 4,750,118 A | 6/1988 | Heitschel et al. | |
| 4,808,995 A | 2/1989 | Clark et al. | |
| 4,829,296 A | 5/1989 | Clark et al. | |
| 4,893,338 A | 1/1990 | Pastor | |
| 4,910,750 A | 3/1990 | Fisher | |
| 4,988,992 A | 1/1991 | Heitschel et al. | |
| 5,021,776 A | 6/1991 | Anderson et al. | |
| 5,136,548 A | 8/1992 | Claar et al. | |
| 5,150,464 A | 9/1992 | Sidhu et al. | |
| 5,197,061 A | 3/1993 | Halbert-Lassalle et al. | |
| 5,252,960 A | 10/1993 | Duhame | |
| 5,420,925 A | 5/1995 | Michaels | |
| 5,442,340 A | 8/1995 | Dykema | |
| 5,517,187 A | 5/1996 | Bruwer et al. | |
| 5,565,812 A | 10/1996 | Soenen | |
| 5,576,701 A | 11/1996 | Heitschel et al. | |
| 5,578,999 A | 11/1996 | Matsuzawa et al. | |
| 5,600,653 A | 2/1997 | Chitre et al. | |
| 5,635,913 A | 6/1997 | Willmott et al. | |
| 5,673,017 A | 9/1997 | Dery et al. | |
| 5,686,904 A | 11/1997 | Bruwer | |
| 5,699,065 A | 12/1997 | Murray | |
| 5,774,065 A | 6/1998 | Mabuchi et al. | |
| 5,838,747 A | 11/1998 | Matsumoto | |
| 5,942,985 A | 8/1999 | Chin | |
| 5,949,349 A | 9/1999 | Farris et al. | |
| 6,012,144 A | 1/2000 | Pickett | |
| 6,049,289 A | 4/2000 | Waggamon et al. | |
| 6,052,408 A * | 4/2000 | Trompower et al. | 375/141 |
| 6,070,154 A | 5/2000 | Tavor et al. | |
| 6,154,544 A | 11/2000 | Farris et al. | |
| 6,157,719 A | 12/2000 | Wasilewski et al. | |
| 6,175,312 B1 | 1/2001 | Bruwer et al. | |
| 6,181,255 B1 | 1/2001 | Crimmins et al. | |
| 6,414,587 B1 | 7/2002 | Fitzgibbon | |
| 6,456,726 B1 | 9/2002 | Yu et al. | |
| 6,496,477 B1 * | 12/2002 | Perkins et al. | 370/228 |
| 6,535,544 B1 * | 3/2003 | Partyka | 375/132 |
| 6,688,518 B1 | 2/2004 | Valencia et al. | |
| 6,690,796 B1 | 2/2004 | Farris | |
| 6,697,379 B1 * | 2/2004 | Jacquet et al. | 370/469 |
| 6,754,266 B2 * | 6/2004 | Bahl et al. | 375/240.01 |
| 6,810,123 B2 | 10/2004 | Farris et al. | |
| 6,829,357 B1 | 12/2004 | Alrabady et al. | |
| 6,850,910 B1 | 2/2005 | Yu et al. | |
| 6,930,983 B2 * | 8/2005 | Perkins et al. | 370/252 |
| 6,963,561 B1 | 11/2005 | Lahat | |
| 6,980,518 B1 * | 12/2005 | Sun et al. | 370/235 |
| 6,980,655 B2 | 12/2005 | Farris et al. | |
| 6,998,977 B2 | 2/2006 | Gregori | |
| 7,002,490 B2 | 2/2006 | Lablans | |
| 7,039,809 B1 | 5/2006 | Wankmueller | |
| 7,042,363 B2 | 5/2006 | Katrak | |
| 7,050,479 B1 * | 5/2006 | Kim | 375/132 |
| 7,071,850 B1 | 7/2006 | Fitzgibbon et al. | |
| 7,139,398 B2 | 11/2006 | Candelore et al. | |
| 7,301,900 B1 | 11/2007 | Laksono | |
| 7,333,615 B1 | 2/2008 | Jarboe et al. | |
| 7,336,787 B2 | 2/2008 | Unger et al. | |
| 7,346,163 B2 | 3/2008 | Pedlow et al. | |
| 7,353,499 B2 | 4/2008 | de Jong | |
| 7,412,056 B2 | 8/2008 | Farris et al. | |
| 7,415,618 B2 | 8/2008 | de Jong | |
| 7,429,898 B2 | 9/2008 | Akiyama et al. | |
| 7,492,905 B2 | 2/2009 | Fitzgibbon | |
| 7,535,926 B1 | 5/2009 | Deshpande et al. | |
| 7,561,075 B2 | 7/2009 | Fitzgibbon et al. | |
| 7,623,663 B2 | 11/2009 | Farris et al. | |
| 7,668,125 B2 * | 2/2010 | Kadous | 370/310 |
| 7,757,021 B2 | 7/2010 | Wenzel | |
| 7,786,843 B2 * | 8/2010 | Witkowski | 340/5.25 |
| 8,194,856 B2 | 6/2012 | Farris et al. | |
| 8,233,625 B2 | 7/2012 | Farris et al. | |
| 8,422,667 B2 | 4/2013 | Fitzgibbon | |
| 2001/0023483 A1 | 9/2001 | Kiyomoto | |
| 2002/0034303 A1 | 3/2002 | Farris | |
| 2002/0184504 A1 | 12/2002 | Hughes | |
| 2002/0191785 A1 | 12/2002 | McBrearty et al. | |
| 2002/0191794 A1 | 12/2002 | Farris et al. | |
| 2003/0056001 A1 | 3/2003 | Mate et al. | |
| 2003/0070092 A1 | 4/2003 | Hawkes et al. | |
| 2003/0072445 A1 | 4/2003 | Kuhlman et al. | |
| 2003/0147536 A1 | 8/2003 | Andivahis et al. | |
| 2003/0177237 A1 | 9/2003 | Stebbings | |
| 2004/0019783 A1 | 1/2004 | Hawkes et al. | |
| 2004/0081075 A1 | 4/2004 | Tsukakoshi | |
| 2004/0174856 A1 | 9/2004 | Brouet et al. | |
| 2004/0181569 A1 | 9/2004 | Attar et al. | |
| 2005/0053022 A1 | 3/2005 | Zettwoch | |
| 2005/0058153 A1 | 3/2005 | Santhoff et al. | |
| 2006/0109978 A1 | 5/2006 | Farris et al. | |
| 2006/0176171 A1 | 8/2006 | Fitzgibbon et al. | |
| 2007/0005806 A1 | 1/2007 | Fitzgibbon | |
| 2007/0006319 A1 | 1/2007 | Fitzgibbon et al. | |
| 2007/0018861 A1 | 1/2007 | Fitzgibbon et al. | |
| 2007/0058811 A1 | 3/2007 | Fitzgibbon et al. | |
| 2008/0229400 A1 | 9/2008 | Burke | |
| 2008/0297370 A1 | 12/2008 | Farris et al. | |
| 2009/0016530 A1 | 1/2009 | Farris et al. | |
| 2009/0021348 A1 | 1/2009 | Farris et al. | |
| 2011/0316668 A1 | 12/2011 | Laird et al. | |
| 2011/0316688 A1 | 12/2011 | Ranjan | |
| 2011/0317835 A1 | 12/2011 | Laird | |
| 2013/0170639 A1 | 7/2013 | Fitzgibbon | |

FOREIGN PATENT DOCUMENTS

| | | |
|---|---|---|
| EP | 1760985 A2 | 3/2007 |
| FR | 2737373 | 1/1997 |
| GB | 2288261 | 10/1995 |
| GB | 2 430 115 | 3/2007 |
| GB | 2440816 | 2/2008 |
| JP | 09322274 | 12/1997 |
| WO | 0010301 | 2/2000 |
| WO | WO 00/10302 | 2/2000 |

OTHER PUBLICATIONS

Search Report Under Section 17, Application No. GB0715089.9; Date of Search: Nov. 27, 2007.
Search Report Under Section 17, Application No. GB0601795.8; Date of Search: May 22, 2006.
GB Examination Report; Gareth Griffiths; dated Nov. 26, 2010; 1 page.
Examination Report Under Section 18(3) Dated Apr. 11, 2011 from British Application No. GB0715089.9.
Combined Search and Examination Report Under Sections 17 and 18(3) Dated Apr. 11, 2011 from British Application No. GB1104752.9.
British Application No. GB1110709.1; Combined Search and Examination Report Under Sections 17 and 18(3); Date of Search: Sep. 29, 2011.
British Application No. GB1110710.9; Combined Search and Examination Report Under Sections 17 and 18(3); Date of Search: Sep. 30, 2011.
U.S. Appl. No. 11/172,524; Office Action Dated Apr. 9, 2009.
British Examination Report Under Section 18(3); British Patent Application No. GB0601795.8; Dated: Apr. 22, 2009.
British Examination Report Under Section 18(3); British Patent Application No. GB0613068.6; Dated Nov. 26, 2010.
Canadian Patent Application No. 2,551,295; Office Action Dated May 6, 2013.
Search Report Under Section 17; British Patent Application No. GB0715089.9; Date of Search: May 9, 2008.
U.S. Office Action Dated Mar. 21, 2011 from U.S. Appl. No. 11/172,525.
Combined Search and Examination Report Under Sections 17 and 18(3) From British Patent Application No. GB0920612.9; Date of Search: Dec. 16, 2009.

(56) References Cited

OTHER PUBLICATIONS

Combined Search and Examination Report Under Sections 17 and 18(3) From British Patent Application No. GB1000541.1; Date of Search: Jan. 28, 2010.
Examination Report Under Section 17 From British Patent Application No. GB0601795.8; Date of Search: Jan. 28, 2010.
Examination Report Under Section 17 From British Patent Application No. GB0601795.8; Date of Search: Sep. 25, 2009.
Examination Report Under Section 17 From British Patent Application No. GB0613068.6; Date of Search: Jan. 31, 2011.
Examination Report Under Section 17 From British Patent Application No. GB0715089.9; Date of Search: Sep. 30, 2010.
Examination Report Under Section 17 From British Patent Application No. GB0920612.9; Date of Search: Jan. 28, 2010.
Examiner's First Report from Australian Patent Application No. 2006202850; Date of Search: Feb. 25, 2010.
Office Action Dated Mar. 21, 2011 from U.S. Patent Application No. 11/172,524.
Search Report Under Section 17 From British Patent Application No. GB0601795.8; Date of Search: Apr. 22, 2009.
Search Report Under Section 17 From British Patent Application No. GB0613068.6; Date of Search: Oct. 12, 2006.
Examination Report Under Section 18(3) dated May 6, 2010 from British Patent Application No. GB061068.6.
Search Report Under Section 17; Application No. GB0715089.9: Date of Search: May 8, 2008.

\* cited by examiner

METHOD AND APPARATUS TO FACILITATE MESSAGE TRANSMISSION AND RECEPTION USING DIFFERENT TRANSMISSION CHARACTERISTICS

TECHNICAL FIELD

This invention relates generally to message transmission and reception techniques and more particularly to the relatively secure conveyance of message contents.

BACKGROUND

Various means of conveying messages are known in the art. In many cases an interest exists in preserving or otherwise maintaining at least some degree of security with respect to conveyance of the message. For example, in some cases it may be desired to prevent an eavesdropping party from gleaning the substantive content of the message. In other cases, as when the message comprises, at least in part, an instruction, command, or similar content it may be desirable to prevent an unauthorized party from effectively transmitting an unauthorized message in order to prevent instigation of unauthorized action by the receiving entity.

For example, movable barrier operators (such as but not limited to garage door openers) often respond to receipt of a wireless remote control signal. In particular, the movable barrier operator will often move a corresponding movable barrier between closed and opened positions in response to such remote control signals. In such a case it often behooves the system operator to seek to ensure that the movable barrier operator will not respond to a remote control signal when transmitted from an unauthorized transmission source.

In some cases the movable barrier operator expects to see a unique identifier or other code in conjunction with, or in lieu of, a specific remote control command. This approach provides at least some degree of security though a more sophisticated unauthorized party may be able to themselves receive such a transmission and co-opt the identifier/code for their own future unauthorized use. With this in mind, so-called rolling codes are often employed to frustrate this approach to breaching the security of such a system. With rolling codes, the code itself changes on a frequent basis pursuant to a plan (such as an implementing algorithm) known to both the transmitter and the receiver. Without knowledge of the underlying scheme by which a next code is selected, an unauthorized party who gains access to a presently used code or identifier will still remain unable to leverage that knowledge in support of effecting unauthorized control over the receiver.

There may be instances, however, when additional security may be desired or appropriate. For example, a given rolling code instantiation may be open to brute force attacks or other weaknesses due to local and/or otherwise unique circumstances.

BRIEF DESCRIPTION OF THE DRAWINGS

The above needs are at least partially met through provision of the method and apparatus to facilitate message transmission and reception using different transmission characteristics described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, one provides a plurality of different transmission characteristics as each corresponds, for example, to various selectable types of transmission techniques or means. When message content exists to be transmitted (such as, but not limited to, a remote control signal) a particular one of the transmission characteristics is selected and a corresponding recovery identifier that correlates to the selected transmission characteristic is selected as well. One then transmits a joint message comprising both the message content as is transmitted using the selected transmission characteristic and the recovery identifier as uniquely corresponds to the selected transmission characteristic.

Upon reception of the recovery identifier, and pursuant to a preferred approach, a particular way of receiving the transmission of the message content portion of the joint message is selected as a function thereof and then used to facilitate reception of that message content portion.

The joint message can assume any of a wide variety of forms. For example, depending upon needs and/or requirements, the joint message can comprise a single contiguous message or can comprise a plurality of discrete transmissions. The recovery identifier and the message content can be discrete with respect to one another or can, if desired, be at least partially integrated with one another.

These teachings are usable with a wide variety of different transmission characteristics and hence can provide benefits with a large number of platforms having transmission/reception agility of various kinds. It will also be seen that these teachings can be employed in conjunction with more traditional identifier/code based techniques including specifically rolling code-based techniques. So configured, security can be increased and often dramatically so. In particular, an unauthorized party will face increased difficulty with respect to viably monitoring the communications of such a system. An unauthorized party will also likely face increased difficulty with respect to accommodating and matching the transmission/reception agility of the resultant system.

Figure 1:
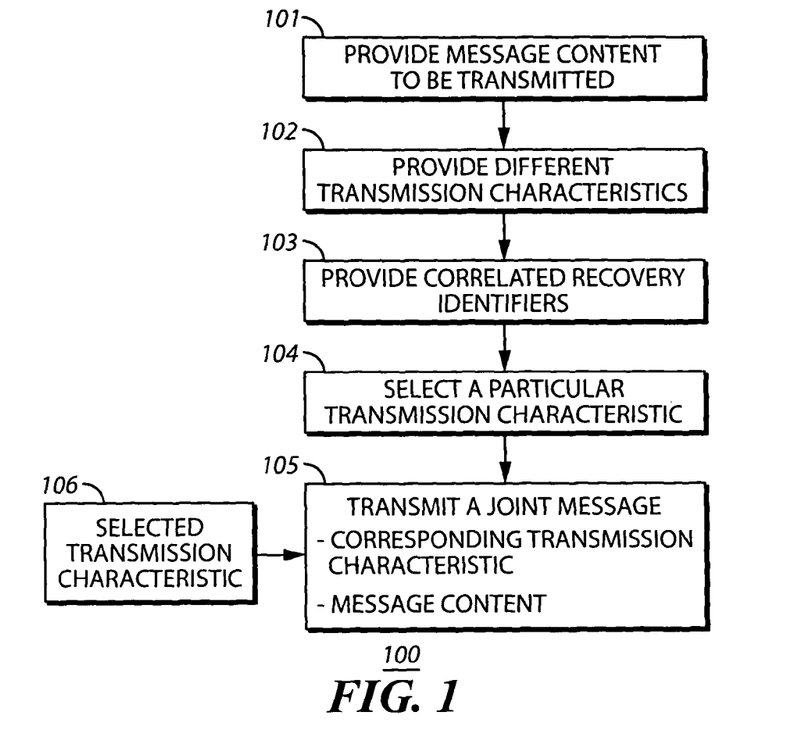
FIG. 1 comprises a flow diagram as configured in accordance with various embodiments of the invention.

These and other benefits may become clearer upon making a thorough review and study of the following detailed description. Referring now to the drawings, and in particular to FIG. 1, an exemplary process 100 provides 101 message content to be transmitted (for example, from a wireless remote control device to a movable barrier operator where the message content comprises remote control signaling, an identifier for at least one of the transmitting platform, the receiving platform, the communication system to which one or more of these elements belongs, and/or a particular communication system user (such as an individual, a particular group of individuals, a business, or some other entity of interest)). In accordance with prior art practice this message content can also comprise, if desired, one or more rolling codes. Those skilled in the art will also understand that this message content can be encrypted, or not, in accordance with the needs and/or requirements of a given application setting.

This process 100 also provides for provision 102 of a plurality of different transmission characteristics. These transmission characteristics pertain to different types of transmission. Relevant examples comprise, but are not limited to:
  a plurality of candidate data rates;
  a plurality of candidate spread spectrum practices (including but not limited to various spreading codes, frequency hopping patterns and/or usable (or unusable) channels, and so forth);
  a plurality of candidate carrier modulations (including but not limited to frequency modulation, amplitude modulation, phase modulation, direct sequencing spread spectrum, frequency hopping spread spectrum, single sideband, vestigial sideband, and so forth);
  a plurality of candidate carrier frequencies (including but not limited to specific center frequencies and corresponding information such as, but not limited to, channel width, guard band presence and/or width, and so forth);
  a plurality of candidate joint message formats (including but not limited to integral formats, parsed formats, and so forth as will be described below in more detail);
  a plurality of candidate data orders (where, for example, the order is changed for all remaining portions of the message, only a portion of the remaining message, or follows a pattern per message position);
  a plurality of candidate data inversion patterns (where, for example, the inversion can be for the rest of the message, for a portion of the message, and/or follows a pattern per message position);
  a plurality of candidate data symbols representing a data value (where, for example, the representation is modified for the whole message, a specific portion of the message, and/or follows a pattern per message position).

In a similar fashion this process 100 then further provides 103 for a correlated (or at least partially correlated) plurality of recovery identifiers (where, for example, a given recovery identifier correlates to and therefore essentially serves to identify a specific one of the transmission characteristics as was provided above). Accordingly, it will be understood that these recovery identifiers can comprise, but are not limited to:
  particular data rate identifiers;
  particular spread spectrum practice identifiers;
  particular carrier modulation identifiers;
  particular carrier frequency identifiers;
  particular joint message format identifiers;
  particular data order identifiers;
  particular data inversion pattern identifiers;
  particular symbol pattern identifiers;
and so forth, to name but a few.

The recovery identifier can comprise, for example, a simple code where a specific value, such as a binary value, corresponds to a particular transmission characteristic. As a simplified example, when only two transmission characteristics are provided then a one-bit value will serve to identify these transmission characteristics. To illustrate, a value of "0" can correlate to a first transmission characteristic while a value of "1" can correlate to the second transmission characteristic. It would be possible, for example, for each recovery identifier to essentially point to a specific entry in a lookup table, where the specific entry itself defines the corresponding transmission characteristic.

If desired, the recovery identifier can share functionality and meaning in support of other content or capability. As an illustration, all or part of a rolling code can also serve as a recovery identifier. For example, and to continue the simple example presented above, the least significant bit of a rolling code can also serve to identify each of two provided transmission characteristics.

Pursuant to this process 100, one then selects 104 a particular one of the different transmission characteristics to thereby provide a selected transmission characteristic. This selection step 104 can be carried out in any of a wide variety of ways with a specific approach likely being dictated by the needs and/or limitations inherent to a given application context. As one example, the particular transmission characteristic can be selected essentially at random. As another example the particular transmission characteristic can be selected pursuant to a pre-selected selection pattern. The selection itself can be the result of a specific selection process or can be a part of another process (as when the particular transmission characteristic selected is dependent upon the least significant bit (or bits) of a rolling code as is derived via its own derivation process).

This process 100 then facilitates the transmission 105 of a joint message that comprises at least the recovery identifier as uniquely corresponds to the selected transmission characteristic and the previously provided message content. In a preferred approach, at least the message content portion of the joint message is transmitted using the selected transmission characteristic 106.

Figure 2:
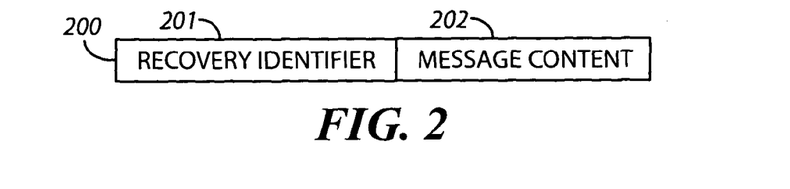
FIG. 2 comprises a schematic view of a data format as configured in accordance with various embodiments of the invention.
Figure 3:
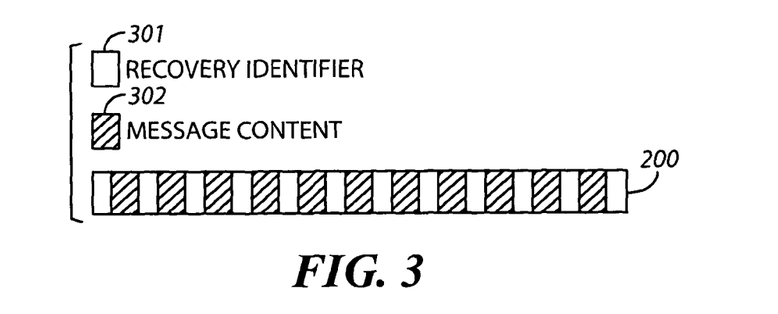
FIG. 3 comprises a schematic view of a data format as configured in accordance with various embodiments of the invention.

There are various useful ways to deploy these teachings. For example, and referring now to FIG. 2, a given joint message 200 can comprise a first portion (such as a first field) that comprises the recovery identifier 201 and a second portion (such as a second field) that comprises the message content 202 where the first and second portion comprise an essentially continuous aggregation of the recovery identifier 201 and the message content 202. When so aggregated, if desired, the two portions or fields can be essentially discrete from one another as suggested by the schematic illustration provided in FIG. 2. If desired, however, these portions can be interleaved with one another as is suggested and shown in FIG. 3. In this illustrative example, small portions comprising parts of the recovery identifier 301 and the message content 302 are interleaved with one another. This interleaving can comprise a symmetrical pattern (as is suggested by the illustration provided) or can be effected using any other pattern or interleaving criteria of choice.

Figure 4:
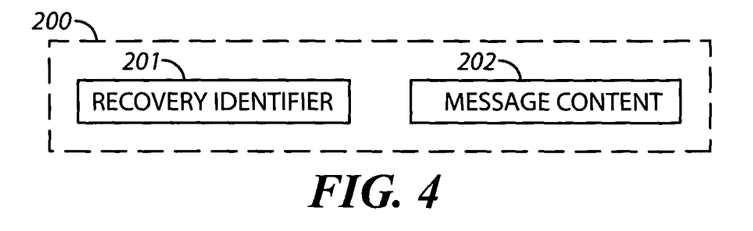
FIG. 4 comprises a schematic view of a data format as configured in accordance with various embodiments of the invention.

In the illustrative examples provided above, the recovery identifier and the message content are aggregated with one another. It is also possible, however, for the joint message 200 to comprise a plurality of discrete messages as is suggested by the schematic depiction of FIG. 4. In this example the recovery identifier 201 is separate and distinct from the message content 202. The nature of this separation can vary with the needs and/or limitations of a given application setting. Useful examples include, but are not limited to, separation by time (as when the individual joint message portions are sent at considerably different times), carrier characteristics (as when the individual joint message portions are sent using different transmission characteristics as pertain to the carrier), specific bit patterns, and/or a specific quantity of bits.

Figure 5:
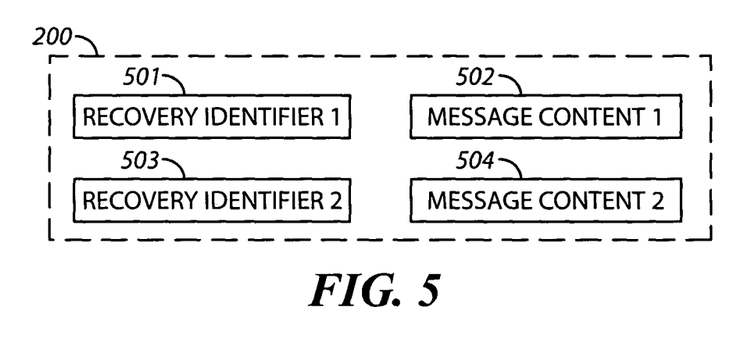
FIG. 5 comprises a schematic view of a data format as configured in accordance with various embodiments of the invention.

The approaches described above can be further parsed and combined in various ways if desired. As but one illustration of many possibilities, and referring now to FIG. 5, the message content can itself be parsed into a first message content portion 502 and a second message content portion 504. In turn, the first message content portion 502 can be sent using a first corresponding transmission characteristic that is identified by a corresponding first recovery identifier 501 and the second message content portion 504 can be sent using a second corresponding transmission characteristic that is identified by a corresponding second recovery identifier 503. These various informational elements can, in turn, be aggregated or separated as described above to form the corresponding joint message 200.

Figure 6:
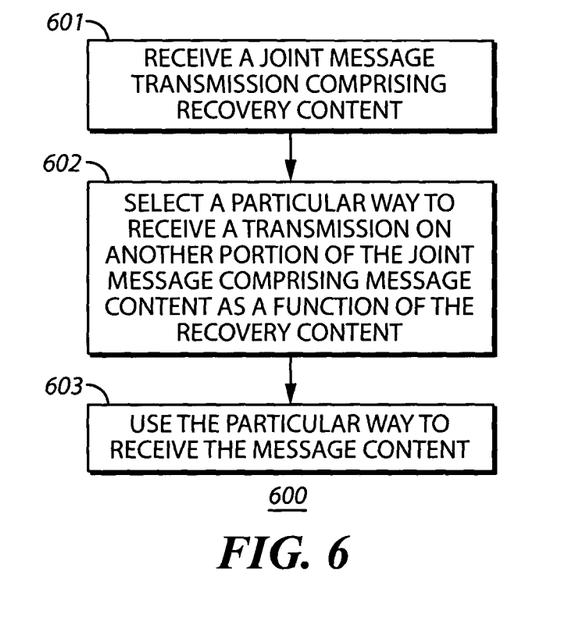
FIG. 6 comprises a flow diagram as configured in accordance with various embodiments of the invention.

Referring now to FIG. 6, a corresponding receive process 600 preferably begins with reception 601 of a joint message (such as those described above) comprising, at least in part, the recovery content (that is, reception of the recovery content portion (or at least a portion thereof) may precede reception of at least part of the message content portion in order to enable use of the recovery content portion to facilitate proper reception of that message content portion). This process 600 then facilitates selection 602 of a particular way of receiving a transmission of another portion of that joint message (which portion comprises, for example, at least a portion of the message content).

In a preferred approach this selection 602 occurs as a function, at least in part, of the recovery content as has already been received. To illustrate, when the recovery content comprises data that correlates to a first transmission characteristic (as was described above) then a way of receiving as corresponds to that first transmission characteristic can be selected. Similarly, when the recovery content comprises data that correlates to a second transmission characteristic then another way of receiving, which corresponds to that second transmission characteristic, can be selected. This process 600 then uses 603 that selected particular way of receiving to facilitate proper reception of that portion of the joint message as comprises at least a portion of the message content.

Figure 7:
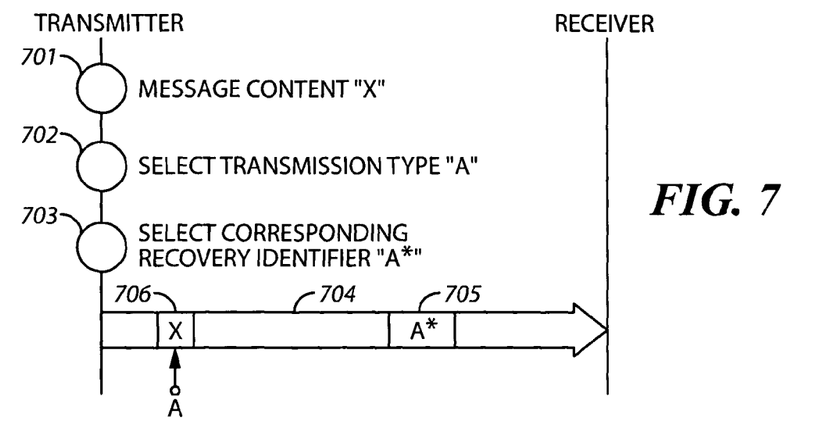
FIG. 7 comprises a call flow diagram as configured in accordance with various embodiments of the invention.

FIG. 7 illustrates one way by which these teachings can be employed. In this illustrative example, a transmitter develops (or otherwise detects a need to transmit already available) message content that is denoted here by the letter "X." 701. In this example, the transmitter then selects a particular transmission type 702 (denoted here by the letter "A") and the recovery identifier 703 (denoted here by the letter "A*") which corresponds thereto. The transmitter then transmits a joint message 704 to a receiver, which joint message 704 includes both the recovery identifier "A*" 705 and the message content "X" 706. And, as per these teachings, at least a portion of the joint message 704 as comprises a portion of the message content 706 is transmitted as per the dictates of the selected transmission type "A."

Upon receiving that portion of the joint message 704 as comprises the recovery identifier "A*" 705, the receiver can employ that information to identify and select the appropriate reception settings that permit compatible reception of that portion of the joint message 704 as comprises, at least in part, at least a part of the message content "X" 706.

So configured, a considerable increase in security occurs. In particular, it becomes increasingly difficult for an unauthorized party to spoof the receiver as mere data alone is insufficient to cause proper reception of the message content. Instead, considerable agility and flexibility with respect to types of transmission must also be supported.

Figure 8:
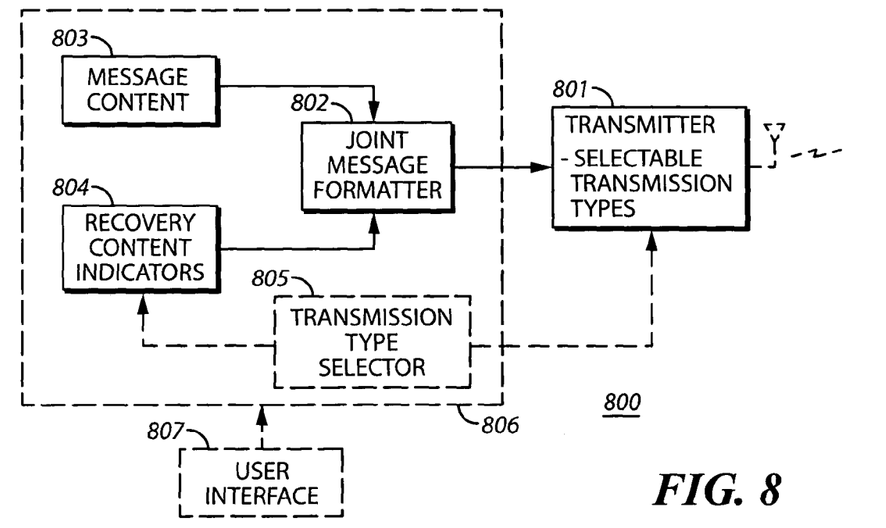
FIG. 8 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 8, an illustrative approach to a particular transmission platform will be provided.

This transmission platform 800 comprises a transmitter 801 that is preferably capable of various selectable types of transmission where, as described above, these various selectable types of transmission differ from one another as a function, at least in part, of corresponding transmission characteristics. In a preferred approach a single dynamically configurable transmitter serves this purpose. If desired, however, the transmitter 801 can comprise a plurality of discrete transmitters that differ from one another in the indicated manner. In a preferred embodiment this transmitter 801 comprises a wireless transmitter.

This transmission platform 800 preferably further comprises a joint message formatter 802 having an input that operably couples to receive message content 803 (as may be stored, for example, in a memory) and another input that operably couples to receive a selected recover content indicator 804 (as may be stored, for example, in another memory). So configured, the joint message formatter 802 serves to format and otherwise provide the joint message described above. If desired, this transmission platform 800 can further comprise a transmission type selector 805 that operably couples to both the recovery content indicators 804 (to facilitate selection of a particular one of the stored indicators) and the transmitter 801 (to facilitate selection of a particular type of transmission to be used when conveying the message content portion of the joint message).

The above-described elements can comprise discrete components if desired. It is also possible, however, to view the transmission platform 800 presented in FIG. 8 as a logical view where one or more of these elements are realized via shared facilities. For example, it may be useful for many applications to use a wholly or partially programmable platform such as a microprocessor 806 to effect the described functionality. It may also be useful, at least in some application settings as when the transmission platform 800 comprises a wireless remote control for a movable barrier operator, to further provide for a user interface 807 (such as, but not limited to, one or more user-assertable buttons, switches, keys, a touch screen, or the like). Such an interface can serve, for example, as a triggering mechanism to begin the described processes.

Figure 9:
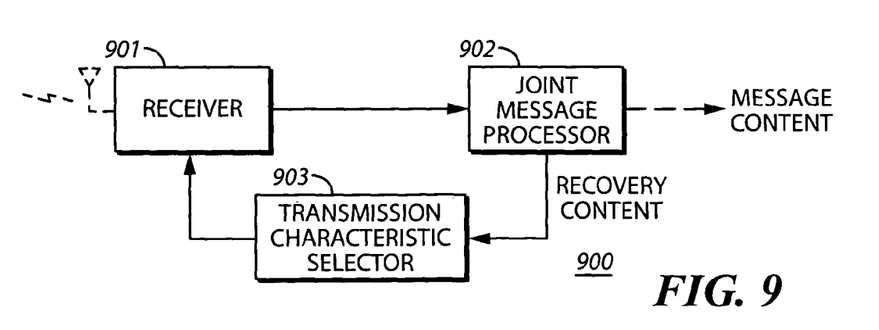
FIG. 9 comprises a block diagram as configured in accordance with various embodiments of the invention.

Referring now to FIG. 9, an illustrative approach to a particular reception platform will be provided. In this illustrative embodiment the reception platform 900 comprises a receiver 901 (for example, a wireless receiver) that is preferably capable of receiving various selectable types of transmissions wherein these selectable types of transmissions differ from one another as a function, at least in part, of corresponding transmission characteristics as have been presented above. As with the above-described transmitter, this receiver 901 can comprise a single selectively agile platform in this regard or can itself be comprised of a plurality of discrete receivers that each support some, but not all, of the selectable types of transmission. Pursuant to these teachings, this receiver 901 is configured and arranged to facilitate compatible reception of a joint message such as those described herein.

This receiver 901 operably couples to a joint message processor 902 which extracts the recovery content and message content as described above from a received joint message. The recovery content, in turn, is provided to a transmission characteristic selector 903 which in turn selects, in this embodiment, a particular transmission characteristic and hence a particular type of reception technique to be employed to facilitate compatible reception of the message content portion of the joint message.

So configured, a transmitter and a corresponding receiver can each readily support the teachings set forth herein. In particular, a plurality of differing types of transmission are selectively usable to effectively encode (in a manner of speaking) message content to be conveyed between the transmitter and the receiver (which message content may comprise, for example, an instruction to be carried out via the receiver). The receiver determines a particular type of reception to employ when receiving the transmission of the message content based, at least in part, upon a recovery indicator that also comprises a part of the overall message.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   selecting a particular transmission characteristic from among a plurality of different transmission characteristics to provide a selected transmission characteristic;
   selecting a particular recovery identifier correlated to the selected transmission characteristic from a plurality of different recovery identifiers, wherein at least a portion of individual ones of the recovery identifiers is correlated to a given corresponding one of the plurality of different transmission characteristics; and
   transmitting from a transmitter a joint message comprising:
      the selected recovery identifier; and
      a message content;
   wherein at least a portion of the joint message as comprises the message content is transmitted using the selected transmission characteristic, and wherein the joint message is configured to allow a receiver to configure itself in response to receipt of the joint message according to the selected transmission characteristic correlated to the recovery identifier to allow the receiver to receive the message content of the joint message,
   wherein the selecting the particular transmission characteristic comprises selecting the particular transmission characteristic based at least in part on at least a portion of the message content.

2. The method of claim 1 wherein the message content comprises remote control signaling.

3. The method of claim 1 wherein selecting the particular transmission characteristic from the plurality of different transmission characteristics comprises selecting at least one of:
   a plurality of candidate data rates;
   a plurality of candidate spread spectrum practices;
   a plurality of candidate carrier modulations;
   a plurality of candidate carrier frequencies;
   a plurality of candidate joint message formats;
   a plurality of candidate data orders;
   a plurality of candidate data inversion patterns.

4. The method of claim 1 wherein selecting a particular recovery identifier of the plurality of different recovery identifiers comprises selecting at least one of:
   a particular data rate identifier;
   a particular spread spectrum practice identifier;
   a particular carrier modulation identifier;
   a particular carrier frequency identifier;
   a particular joint message format identifier;
   a particular data order identifier;
   a particular data inversion pattern identifier.

5. The method of claim 1 wherein transmitting the joint message comprises transmitting a contiguous aggregation of the message content and the recovery identifier as uniquely corresponds to the selected transmission characteristic.

6. The method of claim 5 wherein the joint message further comprises at least a first field comprising the message content and a second field comprising the selected recovery identifier.

7. The method of claim 6 wherein the first field and second field are discrete with respect to one another.

8. The method of claim 6 wherein the first field and the second field are at least partially interleaved with one another.

9. The method of claim 1 wherein transmitting a joint message comprises transmitting a plurality of discrete messages.

10. The method of claim 9 wherein the plurality of discrete messages are separated from one another by at least one of:
    time;
    carrier characteristics;
    specific bit patterns;
    specific quantity of bits.

11. The method of claim 1 wherein the message content comprises, at least in part, an identifier for at least one of:
    a transmitting platform;
    a receiving platform;
    a communication system;
    a communication system user.

12. An apparatus comprising:
    a transmitter capable of various selectable types of transmission, wherein the various selectable types of transmission differ from one another as a function, at least in part, of corresponding transmission characteristics, and wherein the transmitter is configured to transmit a joint message comprising a message content transmitted according to a selected at least one of the transmission characteristics, selected based at least in part on at least a portion of the message content, and with at least one specific recovery content indicator transmitted according to at least one different transmission characteristic, the at least one specific recovery identifier configured to allow a receiver to configure itself in response to receipt of the joint message to receive the message content of the joint message, wherein a plurality of recovery content indicators each individually has at least a portion that corresponds to a given corresponding one of the transmission characteristics; and a joint message formatter having an input operably coupled to receive the message content and the plurality of recovery content indicators and having a joint message output operably coupled to the transmitter and configured to output both the message content and the at least one specific recovery content indicator as corresponds to a presently selected at least one of the transmission characteristics.

13. The apparatus of claim 12 wherein the specific recovery content indicator comprises a portion of the message content.

14. The apparatus of claim 12 wherein the message content comprises remote control signaling.

15. The apparatus of claim 12 wherein the transmission characteristics comprise at least one of:
   a plurality of candidate data rates;
   a plurality of candidate conversion symbol sets;
   a plurality of candidate spread spectrum practices;
   a plurality of candidate carrier modulations;
   a plurality of candidate bit inversion patterns;
   a plurality of candidate carrier frequencies;
   a plurality of candidate bit interleaving patterns;
   a plurality of candidate bit patterns;
   a plurality of candidate joint message formats.

16. The apparatus of claim 12 wherein the recovery content indicator comprises at least one of:
   a particular symbol conversion set identifier;
   a particular spread spectrum practice identifier;
   a particular carrier modulation identifier;
   a particular bit inversion pattern identifier;
   a particular carrier frequency identifier;
   a particular bit interleaving pattern identifier;
   a particular bit pattern identifier;
   a particular joint message format identifier;
   a particular data order identifier.

17. The apparatus of claim 12 wherein the joint message output is configured to provide a contiguous combination of the message content and the specific recovery content indicator.

18. The apparatus of claim 17 wherein the joint message output is further configured to provide at least a first field comprising the message content and a second field comprising the specific recovery content indicator.

19. The apparatus of claim 18 wherein the first field and second field are discrete with respect to one another.

20. The apparatus of claim 18 wherein the first field and the second field are at least partially interleaved with one another.

21. The apparatus of claim 12 wherein the joint message output is configured to provide a plurality of discrete messages.

22. A method comprising:
   receiving at a receiver in a first particular way a transmission of a recovery content portion of a joint message, wherein the recovery content corresponds to a selected transmission characteristic selected based at least in part on a message content portion of the joint message;
   selecting at the receiver in response to receipt of the joint message a second particular way of receiving a transmission of the message content portion of the joint message as a function, at least in part, of the received recovery content;
   the receiver using the second particular way to receive that portion of the joint message that comprises the message content.

23. The method of claim 22 wherein the joint message is a single contiguous message.

24. The method of claim 22 wherein the joint message comprises receiving a plurality of discrete transmissions.

25. The method of claim 22 wherein the message content comprises remote control signaling.

26. The method of claim 22 wherein the first particular way and the second particular way individually comprise at least one of:
   selecting a particular data rate from amongst a plurality of candidate data rates;
   using a particular set of conversion symbols as selected from amongst a plurality of candidate sets;
   selecting a particular spread spectrum practice from amongst a plurality of candidate sets;
   selecting a particular carrier demodulation from amongst a plurality of candidate carrier demodulations;
   selecting a particular bit inversion pattern from amongst a plurality of candidate patterns;
   selecting a particular carrier frequency from amongst a plurality of candidate carrier frequencies;
   selecting a particular bit de-interleaving pattern from amongst a plurality of candidate patterns;
   selecting a particular joint message format from amongst a plurality of candidate formats;
   selecting a particular data inversion patterns from amongst a plurality of candidate patterns.

27. The method of claim 22 wherein the recovery content comprises at least one of:
   a symbol conversion set identifier;
   a spread spectrum practice identifier;
   a carrier demodulation identifier;
   a bit inversion pattern identifier;
   a carrier frequency identifier;
   a bit de-interleaving pattern identifier;
   a joint message format identifier;
   a data pattern inversion pattern identifier.

28. The method of claim 22 wherein receiving a transmission of a joint message comprises receiving a transmission of a joint message wherein the joint message comprises at least a first field comprising the message content and a second field comprising the recovery content.

29. The method of claim 28 wherein the first field and second field are discrete with respect to one another.

30. The method of claim 28 wherein the first field and the second field are at least partially interleaved with one another.

31. The method of claim 28 wherein receiving a transmission of a joint message comprises receiving a plurality of transmitted messages that comprise, when aggregated, the joint message.

32. The method of claim 31 wherein the plurality of transmitted messages are separated from one another by at least one of:
   time;
   carrier characteristics;
   specific bit patterns.

33. The method of claim 22 wherein the message content comprises, at least in part, an identifier for at least one of:
   a transmitting platform;
   a receiving platform;
   a communication system;
   a communication system user.

34. An apparatus comprising:
a receiver capable of receiving various selectable types of transmissions, wherein the various selectable types of transmissions differ from one another as a function, at least in part, of corresponding transmission characteristics, and wherein the receiver is configured to receive a joint message comprising recovery content and message content and to receive the message content portion of the joint message using a selected one of the various selectable types of transmissions identified by the recovery content, the selected one of the various selectable types of transmissions selected based at least in part on at least a part of the message content;
a transmission characteristic selector operably coupled to a control input of the receiver, wherein the transmission characteristic selector is responsive to a recovery content input such that the transmission characteristic selector configures the receiver according to the recovery content within the joint message in response to receipt of the joint message, wherein the recovery content corresponds to the transmission characteristic;
a joint message processor operably coupled to the receiver and to the recovery content input of the transmission characteristic selector, wherein the joint message processor is configured to extract recovery content from the joint message.

35. The apparatus of claim 34 wherein the message content comprises remote control signaling.

36. The apparatus of claim 34 wherein the transmission characteristics comprise at least one of:
a plurality of candidate data rates;
a plurality of candidate conversion symbol sets;
a plurality of candidate spread spectrum practices;
a plurality of candidate carrier modulations;
a plurality of candidate bit inversion patterns;
a plurality of candidate carrier frequencies;
a plurality of candidate bit interleaving patterns;
a plurality of candidate bit patterns;
a plurality of candidate joint message formats.

37. The apparatus of claim 34 wherein the recovery content comprises at least one of:
a particular symbol conversion set identifier;
a particular spread spectrum practice identifier;
a particular carrier modulation identifier;
a particular bit inversion pattern identifier;
a particular carrier frequency identifier;
a particular bit interleaving pattern identifier;
a particular bit pattern identifier;
a particular joint message format identifier;
a particular data order identifier.

38. The apparatus of claim 34 wherein the receiver comprises means for receiving a transmission of a joint message comprising at least a first field comprising the message content and a second field comprising the recovery content.

39. The apparatus of claim 38 wherein the first field and second field are discrete with respect to one another.

40. The apparatus of claim 38 wherein the first field and the second field are at least partially interleaved with one another.

41. The apparatus of claim 38 wherein the transmission of a joint message comprises a plurality of transmitted messages that comprise, when aggregated, the joint message.

42. The apparatus of claim 41 wherein the plurality of transmitted messages are separated from one another by at least one of:
time;
carrier characteristics;
specific bit patterns.

43. The apparatus of claim 34 wherein the message content comprises, at least in part, an identifier for at least one of:
a transmitting platform;
a receiving platform;
a communication system;
a communication system user.

44. A method for use with a receiver that is configured and arranged to compatibly receive and process a transmitted joint message, wherein:
at least a portion of the joint message comprises message content that is transmitted using a selected transmission characteristic as has been selected from amongst a plurality of different transmission characteristics based at least in part on at least a portion of the message content;
at least a portion of the joint message comprises a recovery identifier that is transmitted using a different transmission characteristic, wherein the recovery identifier corresponds to the selected transmission characteristic;
the method comprising:
at a transmitter:
providing a message that will be compatibly received and processed by the receiver as the transmitted joint message for the receiver to configure itself to receive the message content of the joint message according to the recovery identify in response to receipt of the transmitted joint message;
transmitting the message to the receiver.

45. The method of claim 44 wherein transmitting the message to the receiver comprises serially transmitting data elements as comprise the message.

46. The method of claim 45 wherein serially transmitting the data elements as comprise the message comprises serially transmitting the data elements via a wireless connection.

47. A method comprising:
selecting at a transmitter a particular transmission characteristic from among a plurality of different transmission characteristics from the group consisting of at least one of a particular data order or a particular data inversion pattern to provide a selected transmission characteristic selected based at least in part on at least a portion of message content;
selecting at the transmitter a particular recovery identifier correlated to the selected transmission characteristic from a plurality of different recovery identifiers, wherein the recovery identifiers comprise at least one of a particular data order identifier or a particular data inversion pattern identifier, wherein at least a portion of individual ones of the recovery identifiers is correlated to a given corresponding one of the plurality of different transmission characteristics; and
transmitting from the transmitter a joint message comprising:
the selected recovery identifier; and
the message content;
wherein at least a portion of the joint message as comprises the message content is transmitted using the selected transmission characteristic, and
wherein the joint message is configured to allow a receiver to configure itself in response to receipt of the joint message according to the selected recovery identifier to allow the receiver to receive the message content of the joint message.

48. A portable movable barrier remote control transmitter comprising:
a transmitter configured to communicate with a movable barrier operator, and capable of various selectable types of transmission, wherein the various selectable types of transmission differ from one another as a function, at least in part, of corresponding transmission characteristics, and wherein a plurality of recovery content indicators individually has at least a portion that corresponds to a given corresponding one of the transmission characteristics; and a joint message formatter having an input operably coupled to receive message content and the plurality of recovery content indicators and having a joint message output operably coupled to the transmitter to provide a joint message comprising both the message content and the at least one specific recovery content indicator as corresponds to a presently selected at least one of the transmission characteristics selected based at least in part on at least a portion of the message content, wherein the joint message is configured to allow a receiver to configure itself in response to receipt of the joint message according to the presently selected at least one of the transmission characteristics to allow the receiver to receive the message content of the joint message.

49. The portable movable barrier remote control transmitter of claim 48, wherein the transmitter is configured to transmit the message content according to the transmission characteristic selected for the message content and to transmit at least one specific recovery content indicator according to at least one transmission characteristic that is different from the transmission characteristic that is selected for the message content.

\* \* \* \* \*